April 28, 1959 — A. BLOOM ET AL — 2,884,360
RECOVERY OF ORGANIC ISOCYANATES
Filed Oct. 31, 1956
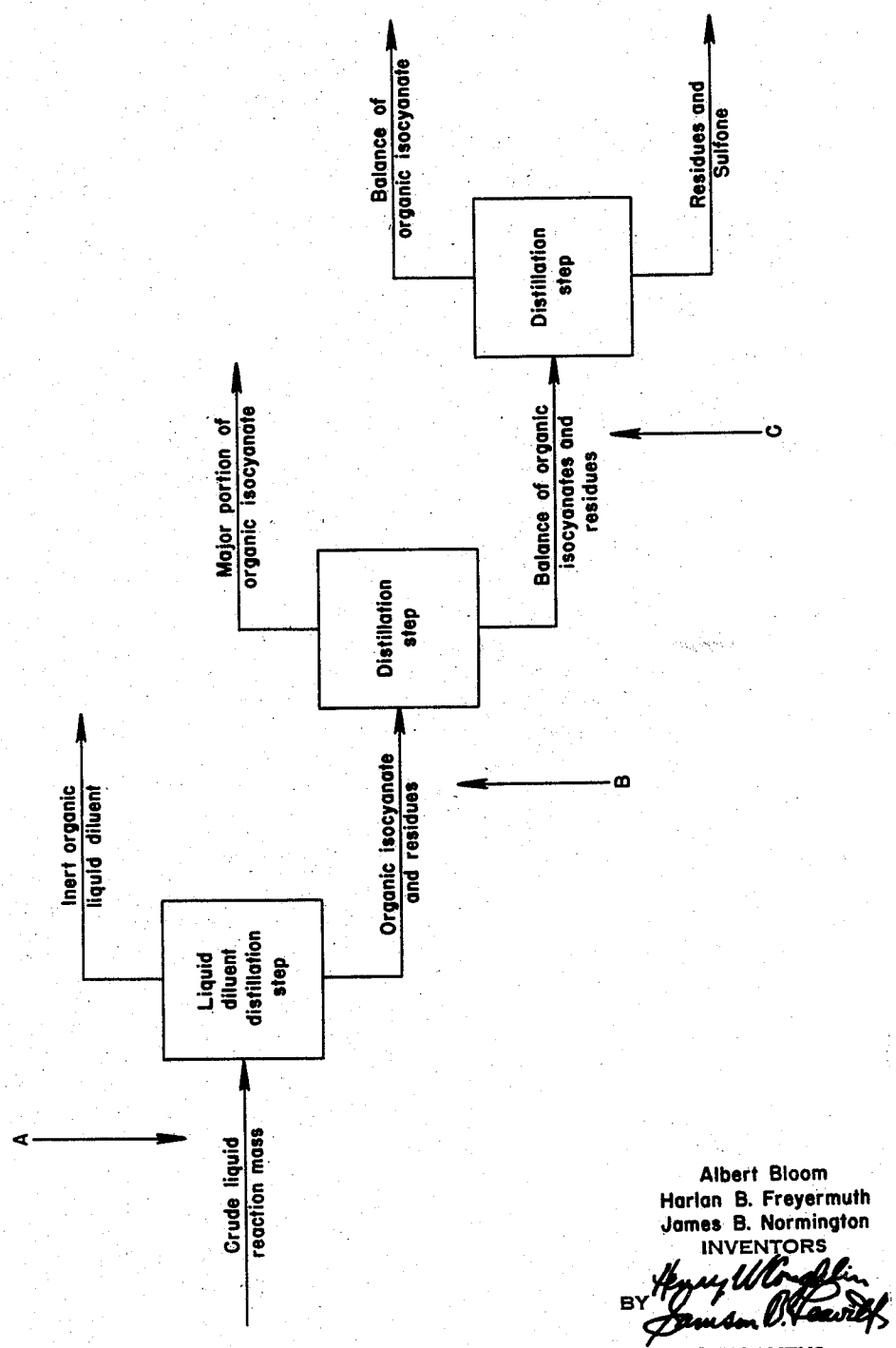
Albert Bloom
Harlan B. Freyermuth
James B. Normington
INVENTORS
BY
ATTORNEYS

United States Patent Office 2,884,360
Patented Apr. 28, 1959

2,884,360
RECOVERY OF ORGANIC ISOCYANATES

Albert Bloom, Summit, N.J., Harlan B. Freyermuth, Easton, Pa., and James B. Normington, Little Silver, N.J., assignors to General Aniline & Film Corporation, New York, N.Y., a corporation of Delaware Application October 31, 1956, Serial No. 619,386

10 Claims. (Cl. 202—57)

This invention relates to an improvement in processes for the production of organic isocyanates and more particularly to a process for recovering organic isocyanates from crude mixtures containing the same.

It has long been known that organic isocyanates may be prepared by reacting phosgene with a primary amine corresponding to the desired isocyanate. The amine is usually employed in the form of its hydrochloride, although the free amine has been used in some cases. In place of phosgene, materials which liberate phosgene during the reaction may also be employed. It is also known that potassium cyanate may be reacted with an organic sulfate to produce the corresponding organic isocyanate. Another proposed method for producing organic isocyanates involves pyrolyzing an N-substituted carbamate and separating the corresponding isocyanate from the pyrolysis products before the latter have had time to reunite and form the starting N-substituted carbamate. The foregoing reactions may be conducted in the absence of an inert organic liquid diluent or in the presence of any one of a large number of previously disclosed inert organic liquid diluents.

During these above-described reactions for the production of organic isocyanates, which are often carried out at elevated temperatures, and during subsequent steps for the treatment of the reaction mass to recover the organic isocyanates therefrom, which usually involves one or more distillation steps, various by-products and polymers of the desired organic isocyanates are produced which results in lower yield of the desired product. Although many attempts have been made to increase the yield of organic isocyanate and/or reduce the amount of undesired by-products and residues remaining, no completely satisfactory solution to the problem has thus far been found. For example, when a reaction mass isp roduced containing the desired organic isocyanate in an inert organic liquid diluent, and the said diluent and the major portion of the isocyanate are removed by distillation, a substantial amount of by-product is obtained as a result of polymerization and/or other undesirable side reactions during the main reaction and the subsequent distillation, which by-product both consumes and entraps considerable quantities of the desired organic isocyanate. In U.S. Patent No. 2,680,128, a method is proposed for more efficient recovery of organic diisocyanates by the addition of a polynuclear hydrocarbon plasticizer to the residue containing the diisocyanate followed by fractional distillation to recover the diisocyanate content. This plasticizer has been found to be often difficult to recover (and reuse) and/or to use in such manner as to attain the desired increased yields.

It is an object of this invention to provide an improved method for recovering an organic isocyanate from crude mixtures containing the same. It is another object of this invention to increase the yield of reactions directed to the production of an organic isocyanate. Other objects and advantages will appear as the description proceeds.

The attainment of the above objects is made possible by the instant invention which comprises a process for recovering the organic isocyanate from a crude mixture containing the same comprising distilling said isocyanate from said mixture in the presence of a member of the group consisting of the dialkyl, diaryl and alkylaryl sulfones which are liquid under the conditions of the distillation. The process of this invention has been found to enable the attainment of increased yields of the desired organic isocyanate and to enable the recovery of organic isocyanates from residues hitherto discarded. Although the mechanism by which the instant process achieves the desired results is not definitely understood, it is believed that the above defined liquid sulfones employed herein may act (1) to increase the relative volatility of the organic isocyanate whereby the isocyanate is more readily volatilized from the distillation mass, (2) as a chemical exerting a depolymerizing action, (3) as a heat exchange medium having a depolymerizing action, or (4) as a fluidizing agent for the by-products, or in accordance with any combination of the foregoing mechanisms.

As examples of sulfones which may be employed in carrying out the instant invention, there may be mentioned the following:

2,5-dimethylphenyl p-tolyl sulfone
4,4'-dichlorodiphenyl sulfone
4,4'-dibromodiphenyl sulfone
Phenyl p-tolyl sulfone
2,5-dichlorophenyl p-tolyl sulfone
Di-o-tolyl sulfone
Di-m-tolyl sulfone
Di-p-tolyl sulfone
Dixenylsulfone
Di-$\alpha$-naphthyl sulfone
$\alpha$-Naphthyl phenyl sulfone
Di-$\beta$-naphthyl sulfone
$\beta$-Naphthyl phenyl sulfone
$\alpha$-Naphthyl-$\beta$-naphthyl sulfone
Methyl p-tolyl sulfone
Ethyl p-tolyl sulfone
n-Butyl p-tolyl sulfone
$\beta$-Chloroethyl p-tolyl sulfone
Ethyl phenyl sulfone
Ethyl p-bromophenyl sulfone
Dimethyl sulfone
Diethyl sulfone
Di-$\beta$-chloroethyl sulfone These sulfones may be defined by the formula $$R^1-SO_2-R^2$$

wherein $R^1$ and $R^2$ are phenyl, naphthyl, biphenyl, or lower alkyl or the like. It will be understood that these sulfones may contain inert substituents which do not interfere with the operation thereof in the instant process, as for example halogen, lower alkyl, and the like. Mixtures of these sulfones may also be employed. As stated, they must be liquid under the conditions of the distillation by which the isocyanate is removed from the mixture, which distillation may be carried out under atmospheric but preferably under sub-atmospheric or vacuum conditions and temperatures dependent upon the boiling point of the isocyanate under the same conditions. Stated otherwise, the sulfones employed herein must be stable, liquid, and have a boiling point higher than that of the organic isocyanate being recovered under the particular distillation conditions employed. The amount of sulfone required to achieve the desired results must be such as to yield a fluid distillation mass, which may be in the form of a solution, dispersion, or suspension or the like. In most cases, however, an amount in excess of this minimum amount is employed since as pointed out above, the sulfone may act in accordance with any one or more of at least four different mechanisms. The optimum amount to be employed in any particular instance to achieve the desired maximum recovery of organic isocyanate will be readily determinable by the person skilled in the art and will depend upon the particular organic isocyanate mixture being treated, the particular sulfone employed and the conditions of distillation, generally ranging from about 25 to 300%, and more preferably about 50 to 100% based on the weight of the organic isocyanate in the mixture.

The process of the present invention has been found to be of particular interest and particularly valuable in the recovery of organic diisocyanates, particularly as present in a reaction mass resulting from the reaction of phosgene with the corresponding aromatic diamine or salt thereof in an inert organic liquid diluent. The instant process is particularly advantageous in cases wherein such inert organic diluent has a boiling point below that of the organic isocyanate contained therein under the conditions of distillation in accordance with the instant process. However, it should be understood that the instant process is equally applicable to the recovery of organic isocyanates generally; i.e., aliphatic, cycloaliphatic, alkyl aryl, aralkyl, heterocyclic and aryl mono-, di- and polyisocyanates. Illustrative examples of these organic isocyanates which may be recovered in accordance with the process of the instant invention, by reaction of phosgene with the corresponding amine, are hexyl isocyanate from hexylamine, octyl isocyanate from octylamine, dodecyl isocyanate from dodecylamine, octadecyl isocyanate from octadecylamine, tetramethylene diisocyanate from tetramethylenediamine, pentamethylene, diisocyanate from pentamethylenediamine, octamethylene diisocyanate from octamethylene diamine, undecamethylene diisocyanate from undecamethylenediamine, dodecamethylene diisocyanate from dodecamethylenediamine, 3,3'-diisocyanate dipropylether from 3,3'-diaminodipropyl ether, etc., cyclohexyl isocyanate from cyclohexylamine, tetrahydro-α-naphthyl isocyanate from tetrahydro-α-naphthylamine, tetrahydro-β-naphthyl isocyanate from tetrahydro-β-naphthylamine, etc., xylene diisocyanates from xylylenediamines, diphenylmethane 4,4'-diisocyanate from 4,4'-diamino-diphenylmethane, β,β'-diphenylpropane 4,4'-diisocyanate from 4,4'-diamino-β-diphenylpropane, etc., benzyl isocyanate from benzylamine, phenylethyl isocyanate from phenylethylamine, p-isocyanato benzyl isocyanate from p-aminobenzylamine, etc., phenyl isocyanate from aniline, p-cetyl phenyl isocyanate from p-cetylaniline, p-dodecylphenyl isocyanate from p-dodecylaniline, 5-dodecyl-2-methylphenyl isocyanate from 5-dodecyl-o-toluidine, 3-nitro-4-dodecylphenyl isocyanate from 3-nitro-4-dodecyl aniline, p-cetyloxyphenyl isocyanate from p-cetyloxyaniline, metaphenylene diisocyanate from metaphenylene diamine, p-phenylene diisocyanate from p-phenylenediamine, 1-methylphenylene-2,4-diisocyanate from 1-methyl phenylene-2,4-diamine, naphthylene 1,4-diisocyanate from 1,4-naphthylene diamine, 2,6-tolylene diisocyanate from 2,6-toluenediamine, 1,3,5-benzene triisocyanate from 1,3,5-benzene triamine, etc., tetrahydrofurfuryl isocyanate from tetrahydrofurfurylamine, etc. It will be understood that the instant process is also applicable to the recovery of organic isocyanates produced by other reactions and from other components for example by prior art reactions discussed above.

In the preferred embodiment of this invention, the above defined sulfone is directly added to the crude liquid reaction mass resulting from the reaction of phosgene with the corresponding aromatic amine or salt thereof in an inert organic liquid diluent, and the resulting mixture subjected to distillation to successively separate the said inert organic liquid diluent and the organic isocyanate in relatively increased yields, the residue consisting essentially of the defined sulfone. An additional advantage of this preferred embodiment is that any by-products present in the mixture or produced during the distillation remain in suspension or solution in the presence of the sulfone and are easily removed from the still in a fluid state. However, improved results are also obtained by addition of the sulfone to the residue of organic isocyanate remaining after distilling off the inert organic liquid diluent, or to the residue of by-products and organic isocyanate remaining after distilling off both the inert organic liquid diluent and the major portion of organic isocyanate. It will be understood, however, that the instant process is applicable for the recovery of organic isocyanates from other mixtures containing the same in liquid or solid form.

The distillation process of the instant invention is carried out in well known manner, and accordingly need not be described in great detail. In general, conditions of temperature and pressure (preferably sub-atmospheric or vacuum) employed in the process will be dependent upon the particular organic isocyanates being recovered, the other components of the distillation mass, and the like.

The attached drawing is a flow sheet illustrative of various embodiments of the process of the present invention. As shown, the desired results may be obtained by adding suitable amounts of sulfone to the system at any of the points indicated at arrows A, B or C. From the incoming crude liquid reaction mass containing organic isocyanate, by-products and inert organic liquid diluent there are obtained, as shown, separate fractions containing inert organic liquid diluent, organic isocyanate, and a residual mixture including by-products and sulfone. It will be understood that any two successive, or all three, distillation steps shown may be carried out in well known manner in a single continuous distillation column, provided of course that the sulfone is added to the system prior to the final distillation step.

The following examples in which parts are by weight unless otherwise indicated are illustrative of the instant invention and are not to be regarded as limitative.

*Example 1*

Into a 2-liter, 4-neck flask is charged 609 grams of o-dichlorobenzene. This solvent is cooled with stirring to 0–10° C. and 140 grams of phosgene are passed in at this temperature. 122 grams of 2,4-tolylene diamine are dissolved in 203 grams of o-dichlorobenzene by heating to 80° C. This hot solution is then added dropwise to the phosgene solution at 0–10° C. A fine slurry results. This slurry is stirred and heated to 100–165° C. in about 2¾ hours while passing phosgene gas therethrough at a rate of apprxoimately 2 grams per minute, at which time solution is complete. The phosgenation is continued for a short additional time, and the solution is then cooled and degassed with dry nitrogen. The weight of the resulting crude solution of 2,4-tolylene diisocyanate in o-dichlorobenzene amounts to 960–980 grams.

*Example 2*

(For comparative purposes)

240 g. (one quarter) of the above resulting crude solution are placed in a 500 cc. round bottom flask and the o-dichlorobenzene distilled through a 15″ glass column having a ¾″ diameter and packed with glass helices. The distillation is carried out under 1–2 mm. pressure. The o-dichlorobenzene is recovered at 35 to 40° C., and the tolylene diisocyanate at 90 to 95° C. 33 g. of tolylene diisocyanate, analyzing 96% (73% of the theoretical yield) is obtained without the use of a sulfone.

*Example 3*

30 g. of 2,5-dimethylphenyl p-tolyl sulfone are added to 240 g. (one quarter) of the above resulting crude solution and the o-dichlorobenzene and tolylene diisocyanate distilled under vacuum as in Example 2. 37.8 g. of tolylene diisocyanate analyzing 98.5% are obtained, which corresponds to 85.6% of the theoretical yield.

*Example 4*

240 g. (one quarter) of the crude solution obtained in Example 1 are distilled as in Example 2 to the point where the o-dichlorobenzene is recovered. 30 g. of the sulfone employed in Example 3 are added to the still and the distillation to recover the tolylene diisocyanate carried out as in Example 2. A yield similar to that of Example 3 is obtained.

*Example 5*

The procedure of Example 2 is repeated, until 32.0 g. of tolylene diisocyanate are obtained, at which time the 12 g. of residue remaining in the flask is still fluid. 15 g. of the sulfone employed in Example 3 are then added to the residue and distillation continued under the same conditions to recover an additional ca. 6 g. of tolylene diisocyanate in a yield similar to that of Example 3.

In the above examples a mixture of 80% 2,4- and 20% 2,6-tolylene diamines may be employed as initial reactants instead of the 2,4-isomer alone, in which case a corresponding mixture of 2,4- and 2,6-tolylene diisocyanates is obtained.

This invention has been disclosed with respect to certain preferred embodiments, and there will become obvious to persons skilled in the art various modifications, equivalents or variations thereof which are intended to be included within the spirit and scope of this invention.

We claim:

1. A process for recovering an organic isocyanate from a crude mixture containing the same, comprising distilling said isocyanate from said mixture in the presence of about 25 to 300%, based on the weight of said isocyanate, of a member of the group consisting of the dialkyl, diaryl and alkylaryl sulfones which are liquid under the conditions of the distillation and which are characterized by the formula $R^1$—$SO_2$—$R^2$ wherein $R^1$ and $R^2$ are selected from the group consisting of lower alkyl of 1 to 4 carbon atoms, phenyl, naphthyl and biphenyl.

2. A process as defined in claim 1 wherein said distillation is carried out at subatmospheric pressure.

3. A process as defined in claim 1 wherein said mixture is in the form of a solution of the organic isocyanate in an inert organic liquid diluent.

4. A process as defined in claim 1 wherein said organic isocyanate is an aromatic diisocyanate.

5. A process as defined in claim 1 wherein said organic isocyanate is 2,4-tolylene diisocyanate.

6. A process as defined in claim 1 wherein said liquid sulfone is employed in proportions of about 50 to 100% of the weight of the organic isocyanate in said mixture.

7. A process as defined in claim 1 wherein said liquid sulfone is 2,5-dimethylphenyl p-tolyl sulfone.

8. A process for recovering an aromatic diisocyanate from a reaction mass produced by reaction of phosgene with an aromatic diamine in an inert organic liquid diluent to produce the corresponding aromatic diisocyanate comprising adding to said reaction mass about 25 to 300%, based on the weight of said diisocyanate, of a member of the group consisting of the dialkyl, diaryl and alkylaryl sulfones which are liquid under the conditions of the subsequent distillation and which are characterized by the formula $R^1$—$SO_2$—$R^2$ wherein $R^1$ and $R^2$ are selected from the group consisting of lower alkyl of 1 to 4 carbon atoms, phenyl, naphthyl and biphenyl, and then successively distilling said inert organic liquid diluent and said aromatic diisocyanate from the reaction mass under vacuum.

9. A process as defined in claim 8 wherein said aromatic amine is 2,4-tolylene diamine and said aromatic diisocyanate is 2,4-tolylene diisocyanate.

10. A process as defined in claim 9 wherein said liquid sulfone is 2,5-dimethylphenyl p-tolyl sulfone.

References Cited in the file of this patent

UNITED STATES PATENTS

| | | |
|---|---|---|
| 2,680,128 | Slocombe et al. | June 1, 1954 |
| 2,680,129 | Flores | June 1, 1954 |
| 2,680,130 | Flores | June 1, 1954 |
| 2,757,183 | Irwin et al. | July 31, 1956 |
| 2,819,949 | Keller et al. | Jan. 14, 1958 |

FOREIGN PATENTS

| | | |
|---|---|---|
| 761,592 | Great Britain | Nov. 14, 1956 |